US006195687B1

United States Patent
Greaves et al.

(10) Patent No.: US 6,195,687 B1
(45) Date of Patent: Feb. 27, 2001

(54) METHOD AND APPARATUS FOR MASTER-SLAVE CONTROL IN A EDUCATIONAL CLASSROOM COMMUNICATION NETWORK

(75) Inventors: Thomas W. Greaves, Palo Alto; Richard A. Milewski, Sunnyvale, both of CA (US); Fred B. Schade, Highland, UT (US); David R. Moore, Redwood City, CA (US); Timothy G. Law, Pleasant Grove, UT (US)

(73) Assignee: Netschools Corporation, Santa Clara, CA (US)

( * ) Notice: Subject to any disclaimer, the term of this patent is extended or adjusted under 35 U.S.C. 154(b) by 0 days.

(21) Appl. No.: 09/044,698

(22) Filed: Mar. 18, 1998

(51) Int. Cl.$^7$ .................................................. G06F 15/16
(52) U.S. Cl. ...................... 709/208; 709/204; 709/205; 709/209; 709/211; 709/244; 345/504; 434/350; 434/365
(58) Field of Search .................................. 709/204, 205, 709/227, 208, 209, 228, 203, 226, 229, 223, 224, 211, 225, 244; 364/132; 345/504; 434/350, 365

(56) References Cited

U.S. PATENT DOCUMENTS

| | | | | |
|---|---|---|---|---|
| 5,005,122 | * | 4/1991 | Griffin et al. | 709/203 |
| 5,310,349 | * | 5/1994 | Daniels et al. | 434/350 |
| 5,437,555 | * | 8/1995 | Ziv-El | 434/336 |
| 5,458,494 | * | 10/1995 | Krohn et al. | 434/336 |
| 5,684,952 | * | 11/1997 | Stein | 709/221 |
| 5,700,149 | * | 12/1997 | Johnson, III et al. | 434/322 |
| 5,724,530 | * | 3/1998 | Stein et al. | 345/329 |
| 5,727,950 | * | 3/1998 | Cook et al. | 434/350 |
| 5,793,951 | * | 8/1998 | Stein et al. | 713/201 |
| 5,805,830 | * | 9/1998 | Reese et al. | 709/205 |
| 5,823,788 | * | 10/1998 | Lemelson et al. | 434/350 |
| 5,850,250 | * | 12/1998 | Konopka et al. | 348/15 |
| 5,867,653 | * | 2/1999 | Aras et al. | 709/204 |
| 5,878,214 | * | 3/1999 | Gilliam et al. | 709/204 |
| 5,887,170 | * | 3/1999 | Ansberry et al. | 709/302 |
| 5,933,498 | * | 8/1999 | Schneck et al. | 705/54 |
| 5,974,446 | * | 10/1999 | Sonnenreich et al. | 709/204 |
| 6,003,067 | * | 12/1999 | Suzuki et al. | 709/204 |
| 6,006,253 | * | 12/1999 | Kumar et al. | 709/204 |
| 6,023,730 | * | 8/1998 | Tani | 709/231 |

OTHER PUBLICATIONS

Decouchant et al. "Structured Cooperative Authoring on the World Wide Web", Dec. 1995.*
Baker et al. "Local Control Over Filtered WWW Access", Nov. 1995.*
David R. Woolley, "Choosing Web Conferencing Software", 1996.*
Yeh et al. "Synchronous Navigation Control for Distance Learning on the Web", May 1996.*
Decouchant et al. "Alliance: A Structured Cooperative Editor on the Web".*
England et al. "RAVE: Real–Time Service for the Web", May 1996.*

(List continued on next page.)

Primary Examiner—Mark Rinehart
Assistant Examiner—William C. Vaughn, Jr.
(74) Attorney, Agent, or Firm—Townsend and Townsend and Crew LLP; Kenneth R. Allen

(57) ABSTRACT

A master-slave network control system and method of operation wherein the master node element has substantially absolute invasive control over functions and capabilities of slave node elements which are logged onto the network and wherein the master node element can exercise latent control over slave node elements when not logged on to the network by controlling reacceptance onto the network in order to promote selected pedagogical and like functions facilitated through networked communication between the master node elements and the slave node elements.

15 Claims, 3 Drawing Sheets

OTHER PUBLICATIONS

Frivold et al. "Extending WWW for Synchronous Collaboration".*

Ming–Chih Lai et al. "Toward a New Educational Environment".*

Bentley et al. "Supporting Collaborative Information Sharing with the World Wide Web: The BSCW Shared Workspace System", Dec. 1995.*

Gutwin et al. Support for Workspace Awareness in Educational Groupware, Sep. 1995.*

* cited by examiner

METHOD AND APPARATUS FOR MASTER-SLAVE CONTROL IN A EDUCATIONAL CLASSROOM COMMUNICATION NETWORK

BACKGROUND OF THE INVENTION

This invention relates to network control and particularly to local area network (LAN) control. In greater particularity, this invention has application to a classroom environment wherein the master device under control of a human supervisor, such as an instructor or test proctor, is able to custom configure slave devices for a particular teaching environment and even temporarily limit selected functionality and access of slave devices.

As computers become more integrated into the educational environment as a teaching and a learning tool, greater use can be made of their unique capabilities to provide collaborative learning and instantaneous feedback. An instructor can broadcast information from a central or teaching node and each student can accept information from the teaching node and provide responses at their learning nodes to demonstrate understanding of concepts conveyed by the instructor. There is a growing recognition of the programmed learning method as an effective pedagogical tool. A typical configuration is a quiz or a test wherein questions are posed by a teacher and responded to by students via an interactive network.

Heretofore, generalized network control systems and configurations have not been developed which are sufficiently adaptable to control the level of information access typically desired in a pedagogical environment. It is desirable for example, in order to promote teaching and learning, to temporarily limit student access to resources otherwise readily accessible via computer telecommunication links or in stored files resident on the local computer storage elements. If computers are to be effectively used to assess understanding and collect student-produced information, then a mechanism must be provided to limit access to the notes of others and assembled information.

It is also desirable to provide a mechanism for customizing teaching environments on a location, a subject matter or on an instructor-tailored basis. Whenever a student computer is brought into a classroom, it is desirable for that computer to be configured for the specific class as soon as it is logged onto the network of the specific room or segment of the network identified with a particular lesson. Still further it is desirable to limit or otherwise manage the student computers to which a particular teacher's computer controls during a particular period in order to minimize conflicts with other computers which may be logged onto the network, particularly where there is no mechanism for segmenting the network to a defined geographic location. For these and other reasons, an enhanced and highly invasive control system is needed in a pedagogical environment.

SUMMARY OF THE INVENTION

According to the invention, a master-slave network control system and method of operation are provided wherein the master node element has substantially absolute invasive control over functions, configuration and capabilities of slave node elements which are logged onto the network and wherein the master node element can exercise latent control over slave node elements when not logged on to the network by controlling reacceptance onto the network in order to promote selected pedagogical and like functions facilitated through networked communication between the master node elements and the slave node elements.

In a specific embodiment, the master node element is a client in communication with a server daemon or service, to convey instructions to the service, and wherein the service oversees and controls substantially all system-level and application-level operations of a plurality of slave node elements during network connection periods, the slave elements also being clients of the service.

In another specific embodiment, the master node element is a server element and the slave node elements are clients of its service.

The master node element and the service operate together, or the master acting as the server operates alone, to effect the following rules:

the master control node can only control slave nodes that are either
  a) assigned to the master node for the duration of a specific time period, and/or
  b) located in a set of physical locations controlled by the master node.

at the end of the specific time period and/or upon departure by the slave node device from the controlled physical location, the slave node device returns to a state of control predefined (by the system) to permit reacceptance of the slave node onto the network under control of the master node.

the slave client node must communicate to the master node its system level status in a timely manner.

At each slave client node, a slave control node module must be invoked which can receive communication from the master control node, acknowledge communication from the master node, shut down an application or application feature on the slave node in an orderly manner, and control invocation of any program, service or driver at the slave node, or it can configure the slave node for a specific application or environment. For security purposes, the slave control module is preferably embedded in the slave node so as not to be defeatable. To this end, the master control node is configured to reaccept logins only from slave control nodes that have not been tampered with, as for example evidenced by appropriate encryption or by a degree of difficulty in modification hardware components which implement the slave control node functions. For example, the slave control node functions can be part of a permanently installed BIOS level ROM program in a portable computer intended for classroom use.

As an operational security feature, the master control node or its surrogate frequently resends its connection commands to nonresponsive slave nodes within the assigned node set to assure that all assigned and present slave nodes are accounted for.

The invention will be better understood by reference to the following detailed description in connection with the accompanying drawings.

DESCRIPTION OF THE PREFERRED EMBODIMENT

Figure 1:
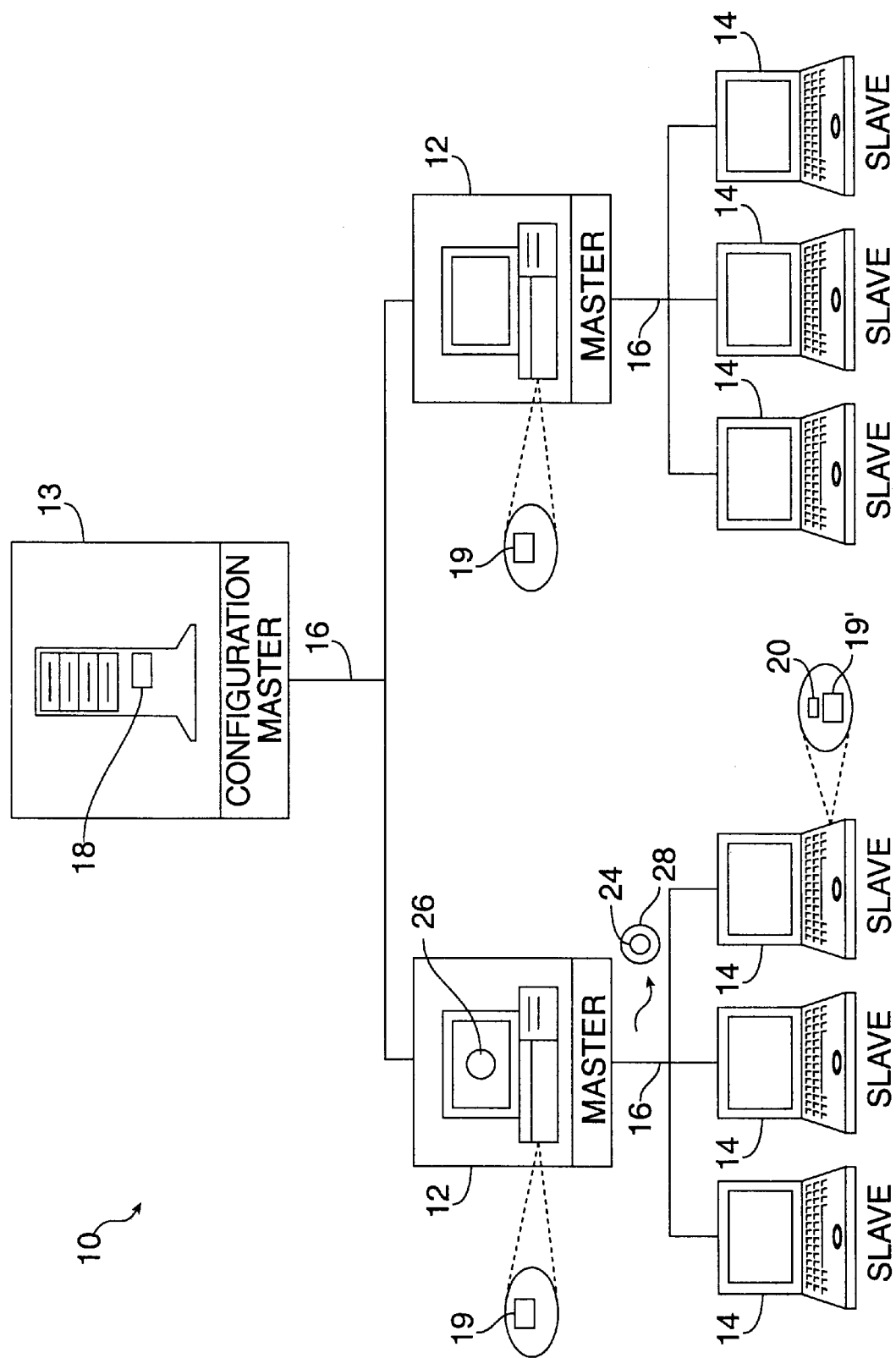
FIG. 1 is a block diagram of an embodiment of a network employing the invention.

Referring to FIG. 1, there is shown a computer network system 10 in accordance with the invention. The computer network system 10 has at least one master node device 12, such as a computer on a school teacher's desk, and a number of slave node devices 14, such as a laptop computer supplied to a student. Some form of telecommunications means 16, such as a wired or wireless local area network (LAN), including infrared wireless, is provided for at least occasionally coupling the master node device 12 with slave node devices 14. The network may be bound by a walled enclosure (a room) or it may be bound by limitations on range and directional orientation of the participating nodes so as to define a locale within which configurations can be established which are other than defaults. The coupling may typically occur during a classroom session in an enclosed room.

In addition, there is a means 18, typically within a configuration master node device 13, for providing an assignment of slave node devices 14 to each master node device 12, each of the slave node devices 14 being selected for assignment according to time/locale control criteria so as to define a scope of controlled influence of the master node device 12, whether or not it is in communication with the slave node devices 14. The time period and locale of the assignment are typically determined by the intended use of the slave node device 14. For example, the slave node device 14 could be used interactively as a teaching aid during a classroom session. Alternatively, the slave node device 14 may be used as a test administering element. The assignment means 18 is typically built around a database management system, with the database 19, 19' thereof being partially distributed between the master node device 12 and the slave node devices 14. In each slave node device 14, there is a means for returning the slave node device 14 to a state of limited autonomous control which is predefined to at least reaccept reassignment from one of the master node devices upon deviation from the time/locale control criteria. This may be embodied in a software daemon 20 (a background service or a background process which is resident and operative on the slave node device 14) having invasive control over BIOS functions, boot functions, peripheral device configuration and like invasive functions.

The time/locale control criteria, in a specific embodiment, distinguish the invention in particular for the classroom. The criteria may be at least one of the following:

during a preselected period, such as a class period;
during a preselected period and within a preselected geographic region, such as within a classroom;
during a preselected period and within a preselected geographic region and having a particular slave node device identity, such as a device identifier or address; and
during a preselected period and with a slave node device identity.

As can be inferred, a great deal of supervisory control can be exercised over a networked computer of an end user, whether or not the end user (the student) device is in the vicinity of a master mode device.

A further aspect of the invention is the control and configuration settings to be exercised "off line." The master node device 12, or any number of them, may be controlled and configured by the configuration master node device 13, the configuration master node device 13 being at least occasionally coupled in a controlling mode. More typically, effective control can be exercised over the slave node devices 14 using the configuration master node device 13 directly coupled (on occasion) to the slave nodes, whereby default configuration information can be provided to the slave node devices 14. The default settings provided by the configuration master 13 can generally be overridden manually by the master node 12 while in communication with the slave node devices 14 assigned to the master node 12. It is of course within the contemplation of the invention to nest slaves with masters and with a configuration master, and the masters with the configuration masters in a hierarchy of master-slave relationships. Moreover, multiple masters can be assigned multiple slaves, in various configurations and priorities, depending on applications and situations, without departing from the scope of the invention wherein control is exercised beyond the domain of direct and immediate communication between slave and master.

The invention has additional functionality in an object-oriented environment. Objects 24 may be communicated via the communication medium 16 between the master node device 12 and slave node devices 14 for processing locally. The object 24 may have information, namely a profile, related to it by means of either a wrapper function 26 which produces a wrapping 28, or by means of a lookup table. The profile is in the form of control criteria associated with the object 24, where association is a form of relating process. The daemon 20 in the slave node device 14 monitors the received objects 24 and interprets any profile for configuration and like control.

Figure 2:
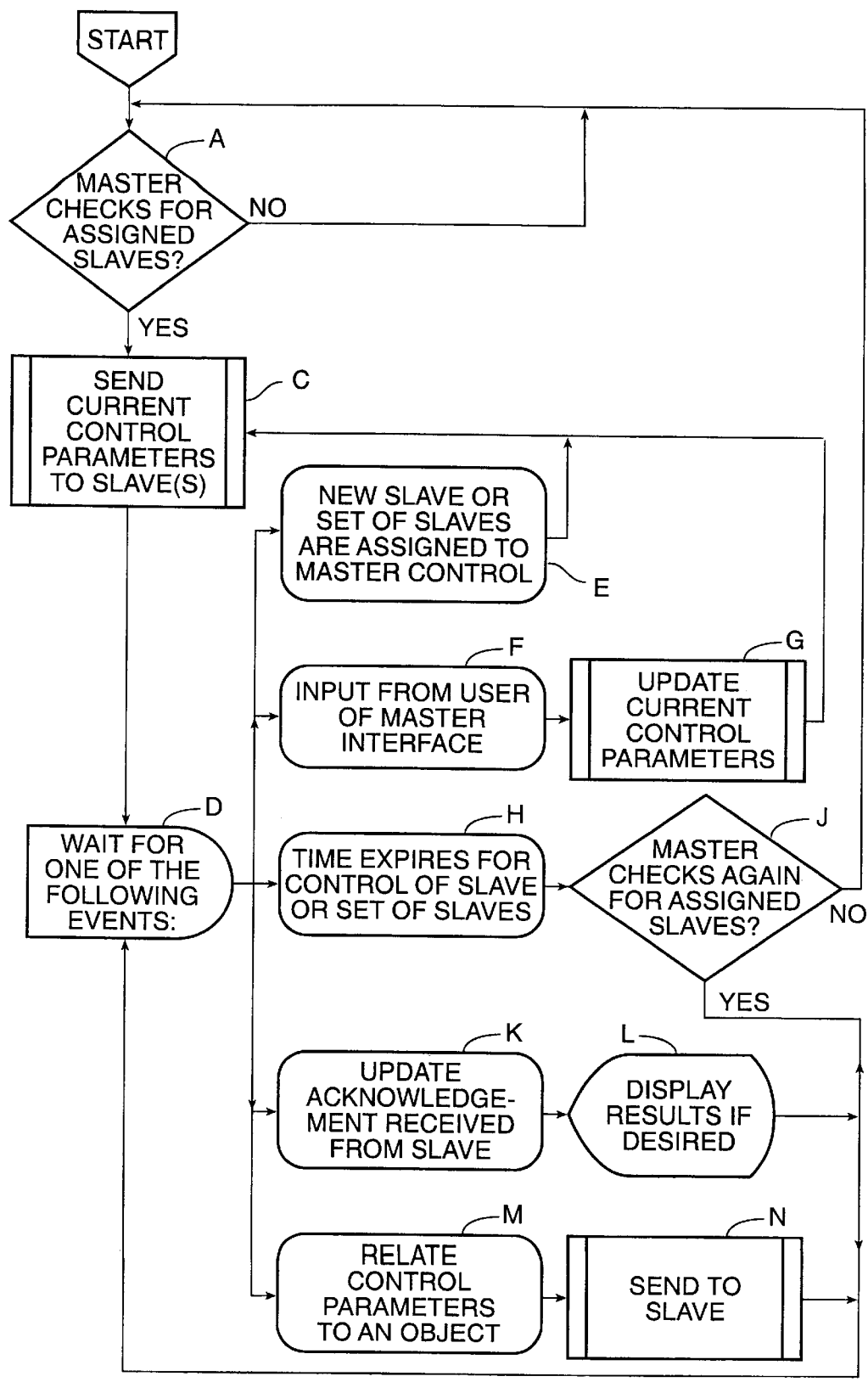
FIG. 2 is a flow chart for operation of a master node device according to the invention.

The methods according to the invention are illustrated in connection with FIGS. 2 and 3. In FIG. 2, the control protocol of the method in the master node device 12 is explained. At the outset, after start up, the master node device 12 tests whether any slave devices are assigned to it (Step A). If not, it loops back to Step A. If any slave is assigned, then the current control parameters are sent to the slave (Step C) and one of several events are awaited (Step D): A new set of slaves is assigned (Step E), which returns control to Step C); interim input is received from a user of the master interface (the teacher) (Step F), in which event the current control parameters are updated (Step G) and control is returned to Step C; timeout on a slave (Step H), in which case a check is made to determine if other slaves are still assigned (Step J), and if not control is returned to Step A, otherwise control is returned to Step D; an acknowledgement is received from a slave (Step K), so that results can be displayed (Step L). In an object oriented system, there is the further step of relating the control parameters to an object (Step M), which object is then sent to the slave (Step N), after which control is returned to Step D.

Figure 3:
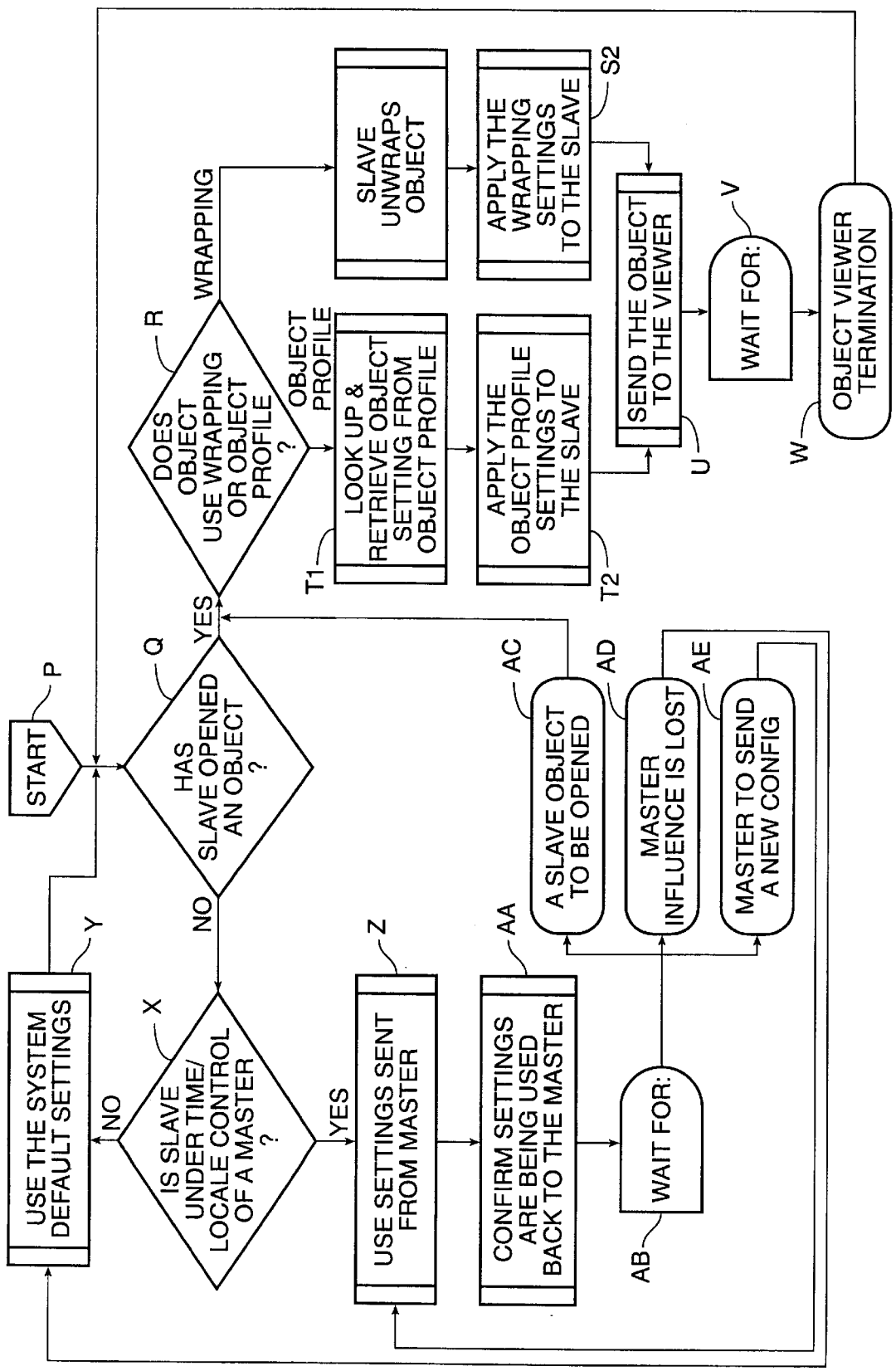
FIG. 3 is a flow chart for operation of a slave node device according to the invention.

FIG. 3 illustrates the slave node device protocol. The slave node device starts with received input (Step P) and if it is an object oriented system, it looks to see if an object uses a wrapping or an object profile (Step R). If it uses a wrapping, the slave daemon unwraps the object (Step S1), then it applies the wrapping settings to the slave, that is, it sets the slave settings from the wrappings (Step S2). If it uses an object profile, it looks up and retrieves the object setting from the object profile, i.e., through a lookup table (T1) and applies the object profile settings to the slave (Step T2). In either scenario, it then sends the object to the local related viewing module (Step U) and waits (Step V) for the object viewing module to terminate (Step W) to allow underlying processes to proceed.

If the slave has not opened an object (Step Q) it tests itself to see whether the slave is under time/locale control of the master (Step X); if not, it uses the system default settings (Step Y).

If it is under time/local control of the master, it uses the settings sent from the master (Step Z), then confirms that those settings are being used (Step AA) and waits (Step AB)

for one of three events: the opening of a slave object (Step AC) (in which case the process returns to Step R) or the loss of master influence (Step AD) (in which case the default settings are restored, including at least the ability to reconfigure), or the master sends a new configuration (Step AE) (in which case the new master-originated settings are used.

It will be appreciated that this invention enables educators and the like to establish a controlled environment optimized for individualized and uniform use of computers by all students in a classroom setting.

The invention has been explained with reference to specific embodiments. Other embodiments will be apparent to those of ordinary skill in the art. It is therefor not intended to be limited, except as indicated by the appended claims.

What is claimed is:

1. A method for controlling access to and behavior of application programs located on slave node computer devices via a wireless educational classroom computer network, said network being bounded by physical spatial boundaries, which network comprises master node devices and slave node computer devices, said method comprising the steps of:

providing an assignment of slave node devices physically located within selected physical boundaries to a selected one of said master node devices, each said slave node device being selected for assignment to one of said slave nodes according to combined control criteria relating to time period of use and of physical location of use so as to define a scope of controlled influence in location and in time by said master node device over said slave node devices, said scope of controlled influence extending beyond said physical boundaries and being unlimited in time, said master node device exercising control over access to and behavior of said application programs and system level programs located on said slave node computer devices whether or not said master node device is in communication with said slave node devices; and upon said slave node computer device either exiting said physical location or by expiration of said time period whether or not within said physical location, causing said slave node computer device to change to a state of limited autonomous control, said limited autonomous control state of said slave node computer device including limitations on access to said application programs located on said slave node computer device and being in a mode to at least reaccept slave node device reassignment from one of said master node devices.

2. The method according to claim 1 wherein said control criteria include one set of the following criteria:

during a preselected period and within a preselected geographic region bounded by a room enclosure;

during a preselected period and within a preselected geographic region and slave node device identity;

during a preselected period and having a specific slave node device identity;

during a preselected period and within a preselected region limited by range and directional orientation.

3. The method according to claim 1 further including configuring said master node devices through at least one configuration master node device which is at least occasionally coupled in a controlling mode to said master node devices.

4. The method according to claim 1 further including configuring said slave node computer devices through at least one configuration master node device which is at least occasionally coupled in a controlling mode to said slave node computer devices.

5. The method according to claim 3 further including invoking supervisory control of said master node devices and said slave node computer devices via said configuration master devices as a default.

6. The method according to claim 1, in an object-oriented environment, relating, by associating or attaching via said master node device control, criteria to an object, said object being communicated to said slave node device.

7. The method according to claim 1 wherein each one of said slave node computer devices communicates, to said master node device, system level status for interactive control in response to setting commands from said master node device.

8. An educational classroom computer network system comprising:

at least one master node device;

at least one slave node computer device;

means for at least occasionally coupling said master node device and said slave node device;

means for providing an assignment of said slave node device physically located within selected physical boundaries to a selected one of said master node devices, each said slave node device being selected for assignment to one of said slave nodes according to combined control criteria relating to time period of use and of physical location of use so as to define a scope of controlled influence in location and in time by said master node device over said slave node devices, said scope of controlled influence extending beyond said physical boundaries and being unlimited in time, said master node device exercising control over access to and behavior of said application programs and system level programs located on said slave node computer devices whether or not said master node device is in communication with said slave node devices; and means in each said slave node device for causing said slave node computer device to change to a state of limited autonomous control, said limited autonomous control state of said slave node computer device including limitations on access to said application programs located on said slave node computer device and being in a mode to at least reaccept slave node device reassignment from one of said master node devices upon said slave node computer device either exiting said physical location or by expiration of said time period whether or not within said physical location.

9. The system according to claim 8 wherein said time/locale control criteria include one set of the following criteria:

during a preselected period and within a preselected geographic region bounded by a room enclosure;

during a preselected period and within a preselected geographic region and slave node device identity;

during a preselected period and with a specific slave node device identity;

during a preselected period and within a preselected region limited by range and directional orientation.

10. The system according to claim 8 further including at least one configuration master node device for configuring said master node devices, said configuration master node device being at least occasionally coupled in a controlling mode to said master node devices.

11. The system according to claim 8 further including at least one configuration master node device for configuring said slave node devices, said configuration master node device being at least occasionally coupled in a controlling mode to said slave node devices.

12. The system according to claim 8, said system including an object-oriented environment, further including means for relating control criteria to an object (a wrapper), said object being communicated to said slave node device so that said slave node device can be preset prior to processing said object.

13. The system according to claim 8 wherein each one of said slave node computer devices communicates, to said master node device, system level status for interactive control in response to setting commands from said master node device.

14. The network system according to claim 9 wherein said coupling means is an infrared wireless communications network wherein coupling is within an enclosed space.

15. The network system according to claim 9 wherein said coupling means is an infrared wireless communications network wherein coupling is physically bounded by range and direction.

* * * * *